(12) United States Patent
Jiang et al.

(10) Patent No.: US 12,063,183 B2
(45) Date of Patent: Aug. 13, 2024

(54) METHOD AND DEVICE USED IN WIRELESS COMMUNICATION NODE

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/241,898

(22) Filed: Sep. 4, 2023

(65) Prior Publication Data

US 2023/0412350 A1  Dec. 21, 2023

Related U.S. Application Data

(63) Continuation of application No. 17/084,673, filed on Oct. 30, 2020, now Pat. No. 11,784,778, which is a (Continued)

(30) Foreign Application Priority Data

Aug. 24, 2018 (CN) .......................... 201810972033.0

(51) Int. Cl.
*H04L 5/00* (2006.01)
*H04W 72/0453* (2023.01)
*H04W 76/14* (2018.01)
*H04W 76/15* (2018.01)

(52) U.S. Cl.
CPC ....... *H04L 5/0098* (2013.01); *H04W 72/0453* (2013.01); *H04W 76/14* (2018.02); *H04W 76/15* (2018.02)

(58) Field of Classification Search
None
See application file for complete search history.

(56) References Cited

U.S. PATENT DOCUMENTS

| 10,476,539 | B1* | 11/2019 | Berger | H04B 7/0885 |
| 2011/0310883 | A1* | 12/2011 | Takano | H04B 7/088 |
| | | | | 370/350 |
| 2019/0335399 | A1* | 10/2019 | Wang | H04B 7/0426 |

FOREIGN PATENT DOCUMENTS

| CN | 101677444 A | 3/2010 |
| CN | 104125631 A | 10/2014 |

(Continued)

OTHER PUBLICATIONS

CN201810972033.0 First Search Report dated Aug. 20, 2021.
(Continued)

*Primary Examiner* — Jenkey Van

(57) ABSTRACT

The disclosure provides a method and device used in wireless communication node. A first node receives K candidate radio signal(s), and receives a first radio signal, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer. The disclosure simplifies the AGC process on terminal side through designing K first-type identifiers, which is suitable for application scenarios with multiple subcarrier spacings on sidelink, thereby improving the overall performance of the system.

14 Claims, 13 Drawing Sheets

Related U.S. Application Data continuation of application No. PCT/CN2019/098842, filed on Aug. 1, 2019.

(56) References Cited

FOREIGN PATENT DOCUMENTS

| CN | 104935542 A | 9/2015 |
|---|---|---|
| CN | 108235420 A | 6/2018 |
| CN | 108419294 A | 8/2018 |
| WO | 2018143774 A1 | 8/2018 |

OTHER PUBLICATIONS

First Office Action received in application No. CN201810972033.0 dated Aug. 25, 2021.

Second Office Action received in application No. CN201810972033.0 dated Jan. 21, 2022.

ISR in applicant PCT/CN2019/098842 dated Sep. 27, 2019.

CATT. "Discussion on 64QAM Modulation Scheme in V2X Phase 2"3GPPTSG RAN WG1Meeting#90 R1-1712341.25 Aug. 2017(Aug. 25, 2017), sections I and 2.

Supplementary Search Report of Chinses patent application No. CN201810972033.0 dated Oct. 13, 2022.

Notification to Grant Patent Right for Invention of Chinses patent application No. CN201810972033.0 dated Oct. 19, 2022.

Samsung "Discussion on AGC settling issue for NR sidelink"3GPP TSG RAN WG1 Meeting #94 R1-1808779 Aug. 10, 2018.

CATT "Physical layer structure and procedure in NR V2X" 3GPP TSG RAN WG1 Meeting #94 R1-1808400 Aug. 11, 2018.

\* cited by examiner

METHOD AND DEVICE USED IN WIRELESS COMMUNICATION NODE

CROSS REFERENCE TO RELATED APPLICATIONS

This application is a continuation of the U.S. patent application Ser. No. 17/084,673, filed on Oct. 30, 2020, which is a continuation of International Application No. PCT/CN2019/098842, filed Aug. 1, 2019, claims the priority benefit of Chinese Patent Application No. 201810972033.0, filed on Aug. 24, 2018, the full disclosure of which is incorporated herein by reference.

BACKGROUND

Technical Field

The disclosure relates to transmission methods and devices in wireless communication systems, and in particular to a method and device for communication on sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The Study Item (SI) of technical research of NR V2X was approved at the 3GPP RAN #80 session.

SUMMARY

In order to meet requirements of new services, compared with LTE V2X systems, NR V2X services have higher throughput, higher reliability, lower latency, further transmission distance, more accurate positioning, higher variability in packet size and transmission periodicity, and key technical features coexisting with current 3GPP technologies and non-3GPP technologies more efficiently. In 5G NR systems, different subcarrier spacings are supported between a base station and a terminal so as to meet different bandwidth and latency requirements; in future NR V2X, different subcarrier spacings will be also supported on sidelink so as to adapt to different application scenarios.

In conventional Rel-12 D2D (Device to Device) and Rel-13 V2X, before two terminals perform communication, a receiving terminal will often use a first received multicarrier symbol of a radio signal as an Automatic Gain Control (AGC) so as to adjust a receiving power of a subsequent radio signal input to an Analog-to-Digital Converter (ADC). Due to single carrier characteristics of Single-Carrier Frequency Division Multiple Access (SC-FDMA), and since the AGC process occupies only one SC-FDMA symbol and the Rel-12 D2D and Rel-13 V2X do not have higher demand on spectrum efficiency, the above conventional D2D transmission does not introduce a preamble sequence dedicated for AGC, that is, the AGC is implemented through wasting partial data channel. In NR V2X, when a relatively higher subcarrier spacing is employed on sidelink, for example, 60 KHz or 120 KHz, the above conventional AGC process will occupy too many multicarrier symbols used for data transmission; considering the future application of beamforming on sidelink, a new AGC method needs to be reconsidered.

In view of the above problems, the disclosure provides a solution to support unicast transmission. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for unicast based transmission mechanisms, the disclosure is also applicable to broadcast and groupcast transmissions. Furthermore, although the disclosure is initially designed for single-carrier communications, the disclosure is also applicable to multi-carrier communications.

The disclosure provides a method in a first node for wireless communication, wherein the method includes:

receiving K candidate radio signal(s); and receiving a first radio signal, the first radio signal being associated to a first identifier.

Herein, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; and the K candidate radio signal(s) and the first radio signal are transmitted by one same transmitter.

In one embodiment, the above method has the following benefits: any one of the K first-type identifier(s) is used for indicating an AGC process to which a corresponding candidate radio signal belongs, the second node in the disclosure transmits the K candidate radio signal(s), and the second node maintains multiple AGC processes; for the first node of the receiving terminal, only candidate radio signals corresponding to those first-type identifiers equal to the first identifier among the K first-type identifiers can be used for the estimation of one same AGC process, which improves the flexibility and precision of AGC estimation.

In one embodiment, the above method has another following benefit: in present Rel-14 V2X systems, a terminal side can acquire a Channel Busy Ratio (CBR) of a channel by sensing Sidelink Control Information (SCI) transmitted by other terminals in the channel; when all receiving terminals of the K1 candidate radio signal(s) experience similar pathlosses relative to the second node, the first node optimizes the result of AGC through sensing the K1 candidate radio signal(s), that is, adjusting its own AGC through the radio signals transmitted to other terminals so as to increase a measurement density of AGC, thereby improving the performance of AGC and shortening the time occupied by AGC.

According to one aspect of the disclosure, the above method includes:

receiving K2 information block(s).

Herein, the K2 information block(s) include(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s).

In one embodiment, the above method has the following benefits: the second node configures a parameter group(s) belonging to the K2 AGC process(es) through the K2 information block(s) respectively, and the parameter group includes terminal identifiers that can be contained in one AGC process, thus, when the first node senses a terminal identifier, the first node can know the AGC process to which the corresponding radio signal belongs, thereby judging whether the radio signal can be used for AGC estimation and adjustment. The complexity of operation of the first node is simplified.

According to one aspect of the disclosure, each one of the K first-type identifier(s) is used for determining one antenna port group, and the antenna port group includes a positive integer number of antenna port(s).

In one embodiment, the above method has the following benefits: different beams from one transmitting terminal correspond to different AGC processes, and the above association of the first-type identifier with an antenna port group is to make different beams correspond to different AGC processes.

According to one aspect of the disclosure, the above method includes:

transmitting a second radio signal.

Herein, each one of the K2 information block(s) includes power control relevant information, and the power control relevant information includes at least one of an expected power and a pathloss compensation factor; the power control relevant information indicated by an information block including the first identifier among the K2 information block(s) is used for determining a transmitting power of the second radio signal.

In one embodiment, the above method has the following benefits: different AGC processes require different power control processes, and the above method to configure different power control relevant information through the K2 information block(s) is to make K2 group(s) of different power control relevant information configured for K2 AGC process(es).

According to one aspect of the disclosure, the K candidate radio signal(s) and the first radio signal all indicate a same third-type identifier.

In one embodiment, the above method has the following benefits: both the K candidate radio signal(s) and the first radio signal indicate the second node, so as to guarantee the accuracy of the receiving power of the first radio signal determined by the first node employing K1 candidate radio signal(s) among the K candidate radio signal(s).

According to one aspect of the disclosure, a transmitter of the K candidate radio signal(s) transmits the K1 candidate radio signal(s) among the K candidate radio signal(s) employing a same transmitting power.

In one embodiment, the above method has the following benefits: the second node guarantees a same transmitting power for the K1 candidate radio signal(s), thereby guaranteeing the accuracy of the method in the disclosure to adjust AGC through the K1 candidate radio signal(s).

The disclosure provides a method in a second node for wireless communication, wherein the method includes:

transmitting K candidate radio signal(s); and transmitting a first radio signal, the first radio signal being associated to a first identifier.

Herein, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

According to one aspect of the disclosure, the above method includes:

transmitting K2 information block(s).

Herein, the K2 information block(s) include(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s).

According to one aspect of the disclosure, each one of the K first-type identifier(s) is used for determining one antenna port group, and the antenna port group includes a positive integer number of antenna port(s).

According to one aspect of the disclosure, the above method includes:

receiving a second radio signal.

Herein, each one of the K2 information block(s) includes power control relevant information, and the power control relevant information includes at least one of an expected power and a pathloss compensation factor; the power control relevant information indicated by an information block including the first identifier among the K2 information block(s) is used for determining a transmitting power of the second radio signal.

According to one aspect of the disclosure, the K candidate radio signal(s) and the first radio signal all indicate a same third-type identifier;

According to one aspect of the disclosure, the second node transmits the K1 candidate radio signal(s) among the K candidate radio signal(s) employing a same transmitting power.

The disclosure provides a first node for wireless communication, wherein the first node includes:

a first receiver, to receive K candidate radio signal(s); and a second receiver, to receive a first radio signal, the first radio signal being associated to a first identifier.

Herein, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; and the K candidate radio signal(s) and the first radio signal are transmitted by one same transmitter.

The disclosure provides a second node for wireless communication, wherein the method includes:
- a second transmitter, to transmit K candidate radio signal(s); and
- a third transmitter, to transmit a first radio signal, the first radio signal being associated to a first identifier.

Herein, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

In one embodiment, compared with conventional schemes, the disclosure has the following advantages.

Any one of the K first-type identifier(s) is used for indicating an AGC process to which a corresponding candidate radio signal belongs, the second node in the disclosure transmits the K candidate radio signal(s), and the second node maintains multiple AGC processes; for the first node of the receiving terminal, only candidate radio signals corresponding to those first-type identifiers equal to the first identifier among the K first-type identifiers can be used for the estimation of one same AGC process, which improves the flexibility and precision of AGC estimation.

In present Rel-14 V2X systems, a terminal side can acquire a Channel Busy Ratio (CBR) of a channel by sensing Sidelink Control Information (SCI) transmitted by other terminals in the channel; when all receiving terminals of the K1 candidate radio signal(s) experience similar pathlosses relative to the second node, the first node senses the K1 candidate radio signal(s) to increase the precision and frequency of AGC measurement, without occupying resources of data channels transmitted to the first node, thereby improving overall performance.

The second node configures a parameter group(s) belonging to the K2 AGC process(es) through the K2 information block(s) respectively, and the parameter group includes terminal identifiers that can be contained in one AGC process, thus, when the first node senses a terminal identifier, the first node can know the AGC process to which the corresponding radio signal belongs, thereby judging whether the radio signal can be used for AGC estimation and adjustment. The complexity of operation of the first node is simplified.

Different AGC processes correspond to different antenna port groups, or different AGC processes correspond to different power control processes, which further widens the application scope of the method proposed in the disclosure.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
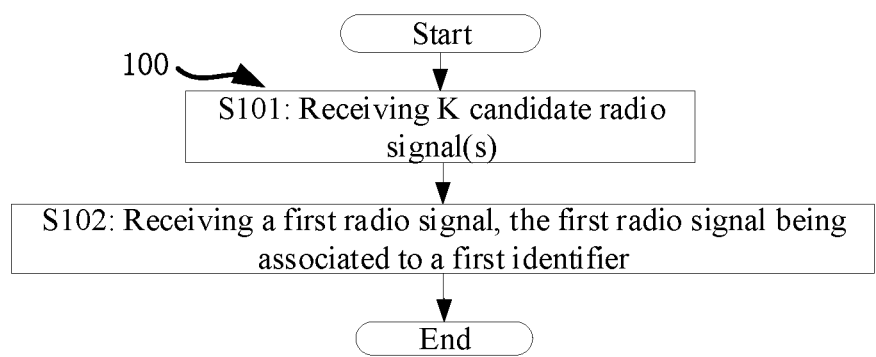
FIG. 1 is a flowchart of K candidate radio signal(s) according to one embodiment of the disclosure.

Embodiment 1 illustrates a flowchart of K candidate radio signal(s), as shown in FIG. 1. In 100 shown in FIG. 1, each box represents one step.

In Embodiment 1, the first node in the disclosure receives K candidate radio signal(s) in S101, and receives a first radio signal in S102, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; and the K candidate radio signal(s) and the first radio signal are transmitted by one same transmitter.

In one embodiment, the phrase that the K candidate radio signal(s) and the first radio signal are transmitted by one same transmitter includes: the K candidate radio signal(s) and the first radio signal are transmitted by one same UE.

In one embodiment, the phrase that the K candidate radio signal(s) and the first radio signal are transmitted by one same transmitter includes: initial values of scrambling sequence generators employed by the K candidate radio signal(s) and the first radio signal are in linear correlation with a second integer.

In one subembodiment, a linear correlation coefficient between the initial value and the second integer is fixed.

In one subembodiment, a linear correlation coefficient between the initial value and the second integer is the 14th power of 2.

In one subembodiment, the K candidate radio signal(s) and the first radio signal correspond to (K+1) PSSCHs respectively, the (K+1) PSSCHs are configured through (K+1) SCIs, and the (K+1) SCIs all include the second integer.

In one subembodiment, the second integer is a Group Destination ID field in TS 36.212.

In one subembodiment, the second integer occupies 8 bits.

In one embodiment, the phrase that the K candidate radio signal(s) and the first radio signal are transmitted by one same transmitter includes: the K candidate radio signal(s) include(s) K Cyclic Redundancy Checks (CRCs) respectively, the first radio signal includes a given CRC, scrambling sequences employed by the K CRC(s) and the given CRC all use a same initial value.

In one embodiment, the phrase that the K candidate radio signal(s) and the first radio signal are transmitted by one same transmitter includes: a scrambling sequence(s) employed by K candidate radio signal(s) and a scrambling sequence employed by the first radio signal all use a same initial value.

In one embodiment, at least two of the K first-type identifiers are equal.

In one embodiment, the K is greater than 1, and the K1 is less than the K.

In one embodiment, the K is greater than 1, and the K1 is equal to the K.

In one embodiment, the K is greater than 1, and the K1 is equal to 1.

In one embodiment, the phrase that the K candidate radio signal(s) is(are) associated to K first-type identifier(s) respectively includes: the K candidate radio signal(s) include(s) the K first-type identifier(s) respectively.

In one embodiment, the phrase that the K candidate radio signal(s) is(are) associated to K first-type identifier(s) respectively includes: the K candidate radio signal(s) indicate(s) the K first-type identifier(s) respectively.

In one embodiment, the phrase that the K candidate radio signal(s) is(are) associated to K first-type identifier(s) respectively includes: K candidate signaling(s) is(are) used for configuring the K candidate radio signal(s) respectively, the K candidate signaling(s) is(are all) a physical layer signaling(s), and the K candidate signaling(s) include(s) the K first-type identifier(s) respectively.

In one subembodiment, any one of the K candidate signaling(s) is an SCI.

In one embodiment, the phrase that the K candidate radio signal(s) is(are) associated to K first-type identifier(s) respectively includes: the K candidate radio signal(s) indicate(s) K second-type identifier(s) respectively, and the K second-type identifier(s) is(are) associated to the K first-type identifier(s) respectively.

In one subembodiment, the K second-type identifier(s) is(are) used for indicating K terminal(s) respectively, the K candidate radio signal(s) is(are) scheduled for the K terminal(s) respectively, or the K candidate radio signal(s) is(are) a data channel(s) transmitted to the K terminal(s) respectively.

In one subembodiment, the K second-type identifier(s) is(are) used for determining K terminal(s) respectively, the K candidate radio signal(s) is(are) scheduled for the K terminal(s) respectively, or the K candidate radio signal(s) is(are) a data channel(s) transmitted to the K terminal(s) respectively.

In one subembodiment, each one of the K second-type identifier(s) consists of Q2 bit(s), and the Q2 is a positive integer.

In one subembodiment, each one of the K first-type identifier(s) consists of Q1 bit(s), and the Q1 is a positive integer.

In one embodiment, the Q2 in the disclosure is greater than the Q1 in the disclosure.

In one embodiment, a channel(s) occupied by the K candidate radio signal(s) include(s) K piece(s) of Physical Sidelink Shared Information (PSSCH) respectively.

In one embodiment, a channel(s) occupied by the K candidate radio signal(s) include(s) K piece(s) of Physical Sidelink Control Information (PSCCH) respectively.

In one embodiment, a channel(s) occupied by the K candidate radio signal(s) include(s) K piece(s) of Physical Sidelink Broadcasting Information (PSBCH) respectively.

In one embodiment, a channel(s) occupied by the K candidate radio signal(s) include(s) K piece(s) of Physical Sidelink Discovery Channel (PSDCH) respectively.

In one embodiment, any one of the K candidate radio signal(s) includes at least one of a Primary Sidelink Synchronization Signal (PSSS) and a Secondary Sidelink Synchronization Signal (SSSS).

In one embodiment, any one of the K candidate radio signal(s) includes a Demodulation Reference Signal (DMRS).

In one embodiment, the phrase that only the K1 candidate radio signal(s) among the K candidate radio signal(s) can be used for controlling a receiving power of the first radio signal includes: only the K1 candidate radio signal(s) among the K candidate radio signal(s) can be used for controlling a receiving power of the first radio signal input to an ADC.

In one embodiment, the phrase that only the K1 candidate radio signal(s) among the K candidate radio signal(s) can be used for controlling a receiving power of the first radio signal includes: only the K1 candidate radio signal(s) among the K candidate radio signal(s) can be used for an AGC of the first radio signal.

In one embodiment, the phrase that only the K1 candidate radio signal(s) among the K candidate radio signal(s) can be used for controlling a receiving power of the first radio signal includes: only the receiving power(s) of the K1 candidate radio signal(s) among the K candidate radio signal(s) can be used for adjusting an amplitude of an amplifier for the first radio signal.

In one embodiment, the phrase that only the K1 candidate radio signal(s) among the K candidate radio signal(s) can be used for controlling a receiving power of the first radio signal includes: only the receiving power(s) of the K1 candidate radio signal(s) among the K candidate radio signal(s) is(are) used for regulating a signal strength of the first radio signal input to an ADC, to as to adapt to the signal to noise ratio requirements of decoding.

In one embodiment, the phrase that only the K1 candidate radio signal(s) among the K candidate radio signal(s) can be used for controlling a receiving power of the first radio signal includes: only the K1 candidate radio signal(s) among the K candidate radio signal(s) is(are) used for maintaining receiving links operated within a proper dynamic scope and guaranteeing the first radio signal to keep stable in input to an ADC.

In one embodiment, the phrase that only the K1 candidate radio signal(s) among the K candidate radio signal(s) can be used for controlling a receiving power of the first radio signal includes: only the K1 candidate radio signal(s) among the K candidate radio signal(s) is(are) used for measuring a Receiver Signal Strength Indicator (RSSI) and used for determining an open-loop transmitting power of a transmitting terminal of the first node.

In one embodiment, the phrase that the first radio signal is associated to the first identifier includes: the first radio signal includes the first identifier.

In one embodiment, the phrase that the first radio signal is associated to the first identifier includes: a given signaling is used for determining at least one of frequency domain resources occupied by the first radio signal and time domain resources occupied by the first radio signal, and the given signaling includes the first identifier.

In one embodiment, the first identifier corresponds to one AGC process.

In one embodiment, the first identifier is used for identifying one AGC process.

In one embodiment, the second node in the disclosure maintains K3 AGC processes, the first identifier corresponds to one of the K3 AGC processes, K1 candidate radio signal(s) among the K candidate radio signal(s) is(are) associated to the AGC process corresponding to the first identifier, and the K3 is a positive integer greater than 1.

In one subembodiment, the K3 is equal to the K2 in the disclosure.

Embodiment 2

Figure 2:
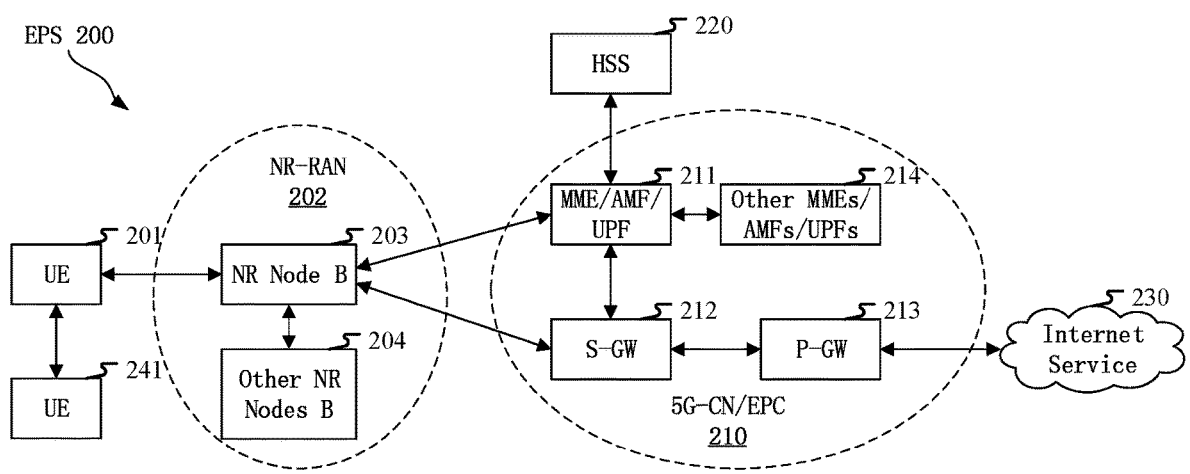
FIG. 2 is a diagram illustrating a network architecture according to one embodiment of the disclosure.

Embodiment 2 illustrates a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, one UE 241 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 241 corresponds to the second node in the disclosure.

In one embodiment, the first node in the disclosure is the UE 201, and the second node in the disclosure is one terminal under the coverage of the gNB 203.

In one embodiment, the first node in the disclosure is the UE 201, and the second node in the disclosure is one terminal out of the coverage of the gNB 203.

In one embodiment, the first node and the second node in the disclosure are both served by the gNB 203.

In one embodiment, the UE 201 supports beamforming based radio transmission.

In one embodiment, the UE 241 supports beamforming based radio transmission.

In one embodiment, the gNB 203 supports beamforming based radio transmission.

In one embodiment, the UE 201 supports multiple Radio Frequencies (RFs).

In one embodiment, the UE 241 supports multiple RFs.

In one embodiment, the UE 201 supports sensing of spectrum without cellular network deployed.

In one embodiment, the UE 241 supports sensing of spectrum without cellular network deployed.

In one embodiment, the UE 201 supports Listen Before Talk (LBT).

In one embodiment, the UE 241 supports LBT.

Embodiment 3

Figure 3:
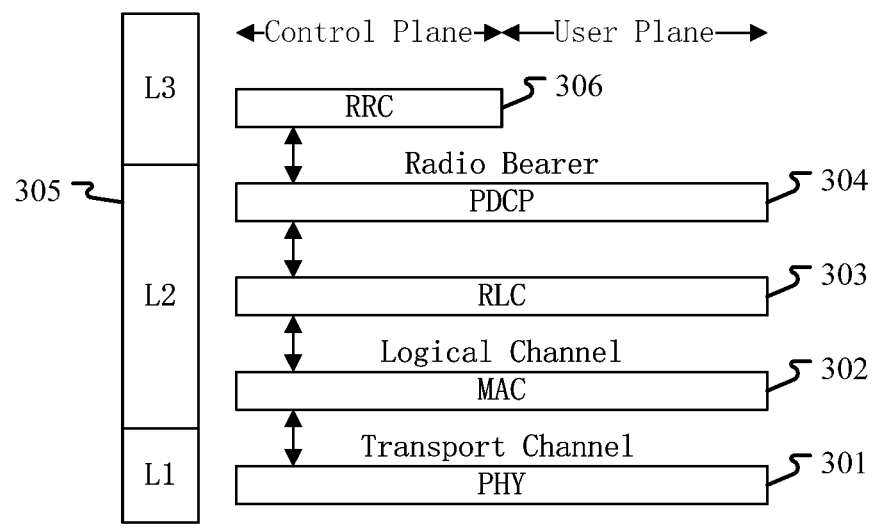
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions.

The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the base station in the disclosure.

In one embodiment, the K candidate radio signals in the disclosure are generated on the PHY 301.

In one embodiment, the K candidate radio signals in the disclosure are generated on the MAC sublayer 302.

In one embodiment, the first radio signal in the disclosure is generated on the PHY 301.

In one embodiment, the first radio signal in the disclosure is generated on the MAC sublayer 302.

In one embodiment, the second radio signal in the disclosure is generated on the PHY 301.

In one embodiment, the second radio signal in the disclosure is generated on the MAC sublayer 302.

In one embodiment, the K2 information blocks in the disclosure are generated on the MAC sublayer 302.

In one embodiment, the K2 information blocks in the disclosure are generated on the RRC sublayer 306.

Embodiment 4

Figure 4:
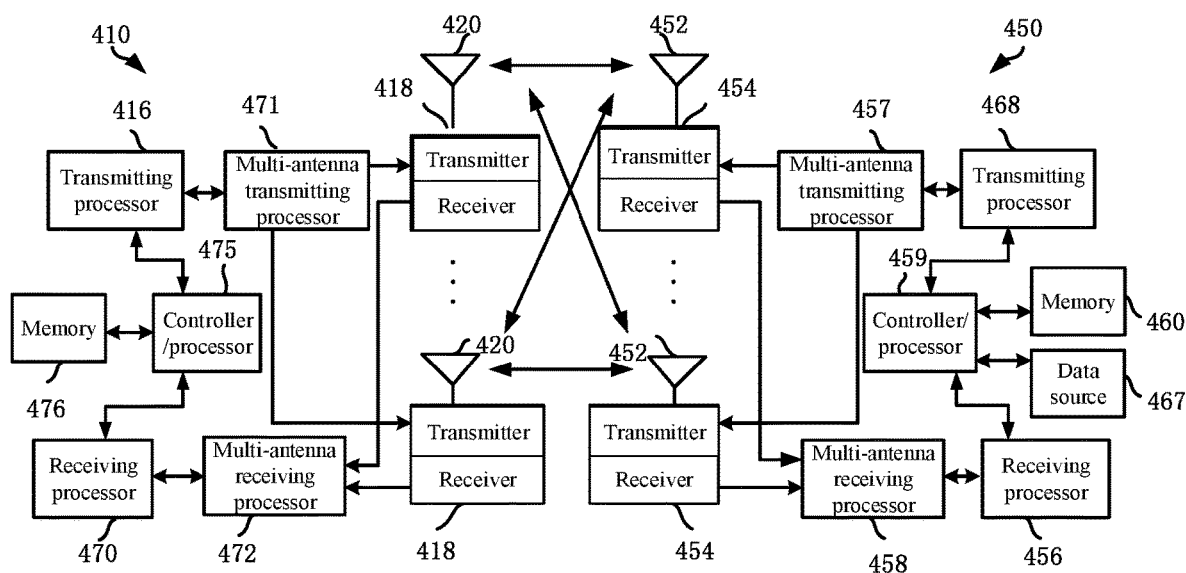
FIG. 4 is a diagram illustrating a first communication node and a second communication node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives K candidate radio signal(s), and receives a first radio signal, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

In one embodiment, the first communication equipment 450 includes a memory that stores a computer readable instruction program. The computer readable instruction program generates an action when executed by at least one processor. The action includes: receiving K candidate radio signal(s), and receiving a first radio signal, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits K candidate radio signal(s), and transmits a first radio signal, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

In one embodiment, the second communication equipment 410 includes a memory that stores a computer readable instruction program. The computer readable instruction program generates an action when executed by at least one processor. The action includes: transmitting K candidate radio signal(s), and transmitting a first radio signal, the first radio signal being associated to a first identifier; the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; and each one of the K first-type identifier(s) is an integer.

In one embodiment, the first communication equipment 450 corresponds to the first node in the disclosure.

In one embodiment, the second communication equipment 410 corresponds to the second node in the disclosure.

In one embodiment, at least one of the antenna 452, the receiver 454, the multiantenna receiving processor 458 or the receiving processor 456 is used for receiving the K candidate radio signals in the disclosure; and at least one of the antenna 420, the transmitter 418, the multiantenna transmitting processor 471 or the transmitting processor 416 is used for transmitting the K candidate radio signals in the disclosure.

In one embodiment, at least one of the antenna 452, the receiver 454, the multiantenna receiving processor 458 or the receiving processor 456 is used for receiving the first radio signal in the disclosure, the first radio signal being associated to the first identifier in the disclosure; and at least one of the antenna 420, the transmitter 418, the multiantenna transmitting processor 471 or the transmitting processor 416 is used for transmitting the first radio signal in the disclosure, the first radio signal being associated to the first identifier in the disclosure.

In one embodiment, at least one of the antenna 452, the receiver 454, the multiantenna receiving processor 458 or the receiving processor 456 is used for receiving the K2 information blocks in the disclosure; and at least one of the antenna 420, the transmitter 418, the multiantenna transmitting processor 471 or the transmitting processor 416 is used for transmitting the K2 information blocks in the disclosure.

In one embodiment, at least one of the antenna 452, the transmitter 454, the multiantenna transmitting processor 457 or the transmitting processor 468 is used for transmitting the second radio signal in the disclosure; and at least one of the antenna 420, the receiver 418, the multiantenna receiving processor 472 or the receiving processor 470 is used for receiving the second radio signal in the disclosure.

Embodiment 5

Figure 5:
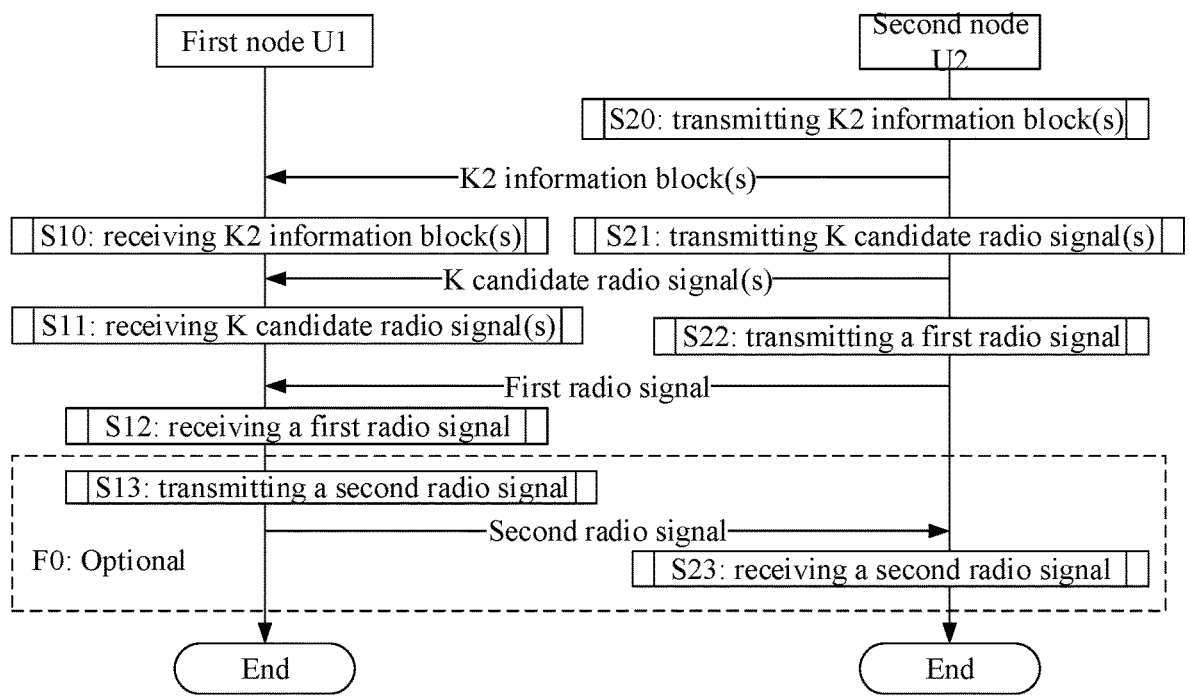
FIG. 5 is a flowchart of a first radio signal according to one embodiment of the disclosure.

Embodiment 5 illustrates a flowchart of a first radio signal, as shown in FIG. 5. In FIG. a first node U1 and a second node U2 perform communication through sidelink. Steps in dash line box FO are optional.

The first node U1 receives K2 information block(s) in S10, receives K candidate radio signal(s) in S11, receives a first radio signal in S12, the first radio signal being associated to a first identifier, and transmits a second radio signal in S13.

The second node U2 transmits K2 information block(s) in S20, transmits K candidate radio signal(s) in S21, transmits a first radio signal in S22, the first radio signal being associated to a first identifier, and receives a second radio signal in S23.

In Embodiment 5, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; the K2 information block(s) include(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s); each one of the K2 information block(s) includes power control relevant information, and the power control relevant information includes at least one of an expected power and a pathloss compensation factor; the power control relevant information indicated by an information block including the first identifier among the K2 information block(s) is used for determining a transmitting power of the second radio signal.

In one embodiment, the K candidate radio signal(s) and the first radio signal are transmitted on one same carrier by the second node U2.

In one embodiment, any one of the K first-type identifiers is used for indexing one AGC process, and any one of the K candidate radio signals can be used for controlling a receiving power of any one other candidate radio signal that occurs later and belongs to the same AGC process.

In one embodiment, the K2 is greater than 1, and any two of the K2 first-type identifiers are unequal.

In one embodiment, the K2 information blocks correspond to K2 AGC processes respectively, and the K2 first-type identifiers identify the K2 AGC processes respectively.

In one subembodiment, any one of the K2 information blocks includes at least one of the K first-type identifiers.

In one subembodiment, at least one of the K2 information blocks includes one first-type identifier other than the K first-type identifiers.

In one embodiment, each one of the K2 information blocks includes a positive integer number of second-type identifier(s), and each one of the positive integer number of second-type identifier(s) is associated to a first-type identifier included in its information block; the K candidate radio signals include K second-type identifiers respectively, any one of the K second-type identifiers is indicated by one of the K2 information blocks; and any one of the K candidate radio signals is associated to a first-type identifier included in an information block which indicates a corresponding second-type identifier.

In one subembodiment, the first radio signal includes a second identifier, the second identifier is one second-type identifier indicated by one of the K2 information blocks, and the first identifier is a first-type identifier identified by an information block indicating the second identifier.

In one affiliated embodiment of the above subembodiment, the second node U2 in the disclosure transmits the K candidate radio signals, the second node U2 performs sidelink communication with K4 terminals, the first node U1 is one of the K4 terminals, and the second identifier is used for uniquely determining the first node U1 from the K4 terminals.

In one embodiment, the K2 information block(s) is(are) broadcast.

In one embodiment, the K2 information block(s) is(are) a higher layer signaling(s).

In one embodiment, the K2 information block(s) is(are) system information.

In one embodiment, the K2 information block(s) is(are) an RRC signaling(s).

In one embodiment, the K2 information block(s) is(are) specific to the first node U1.

In one embodiment, the K2 information block(s) is(are) transmitted on one same PSCCH.

In one embodiment, the K2 information block(s) is(are) transmitted on one same PSDCH.

In one embodiment, the K2 information block(s) is(are) transmitted on one same PSBCH.

In one embodiment, the K2 information block(s) is(are) transmitted on one same PSSCH.

In one embodiment, each one of the K first-type identifier(s) is used for determining one antenna port group, and the antenna port group includes a positive integer number of antenna port(s).

In one subembodiment, each one of the K first-type identifier(s) indicates a transmitting antenna port group for a corresponding candidate radio signal.

In one subembodiment, each one of the K first-type identifier(s) indicates reference signal resources occupied by a corresponding candidate radio signal.

In one affiliated embodiment of the above sub embodiment, the reference signal includes a Channel State Information Reference Signal (CSI-RS), or the reference signal includes a DMRS.

In one affiliated embodiment of the above subembodiment, the reference signal is a reference signal for sidelink.

In one subembodiment, each one of the K first-type identifier(s) indicates a spatial receiving parameter for a corresponding candidate radio signal.

In one subembodiment, an antenna port group indicated by each one of the K first-type identifiers is Quasi Co-Located (QCLed) with a transmitting antenna port group of a corresponding candidate radio signal.

In one affiliated embodiment of the above subembodiment, the phrase that two antenna port groups are QCLed includes: full or partial large-scale properties of a radio signal transmitted by one of the two antenna port groups can be deduced from full or partial large-scale properties of a radio signal transmitted by the other one of the two antenna port groups, and the large-scale properties include one or more of delay spread, Doppler spread, Doppler shift, path loss or average gain.

In one embodiment, the second radio signal occupies a PSSCH.

In one embodiment, the power control relevant information indicated by an information block including the first identifier among the K2 information block(s) includes a first expected power and a first pathloss compensation factor.

In one subembodiment, the first expected power is in linear correlation with the transmitting power of the second radio signal, and the linear correlation coefficient is equal to 1.

In one subembodiment, the first pathloss compensation factor is in linear correlation with the transmitting power of the second radio signal, and the linear correlation coefficient is equal to a pathloss between the first node U1 and the second node U2.

In one subembodiment, the first pathloss compensation factor is in linear correlation with the transmitting power of the second radio signal, and the linear correlation coefficient is equal to a pathloss between the first node U1 and a base station for a serving cell of the first node U1.

In one embodiment, the K candidate radio signal(s) and the first radio signal all indicate a same third-type identifier.

In one subembodiment, the same third-type identifier is used for indexing the second node U2.

In one subembodiment, the K candidate radio signal(s) and the first radio signal are transmitted by one same terminal.

In one subembodiment, the third-type identifier is an International Mobile Subscriber Identification Number (IMSI) of the second node U2.

In one subembodiment, the third-type identifier is a remainder of an IMSI of the second node U2 modulo a given positive integer.

In one affiliated embodiment of the above subembodiment, the given positive integer is equal to 1024.

In one subembodiment, the third-type identifier is an SAE Temporary Mobile Subscriber Identity (S-TMSI) of the second node U2.

In one subembodiment, the third-type identifier is a remainder of an S-TMSI of the second node U2 modulo a given positive integer.

In one affiliated embodiment of the above subembodiment, the given positive integer is equal to 1024.

In one subembodiment, the third-type identifier is a Cell-Radio Network Temporary Identifier (C-RNTI) of the second node U2.

In one embodiment, the K candidate radio signal(s) and the first radio signal are transmitted by the second node U2, and initial values of scrambling sequence generators employed by the K candidate radio signal(s) and the first radio signal are generated by the third-type identifier.

In one subembodiment, a linear correlation coefficient between the initial value and the third-type identifier is fixed.

In one subembodiment, a linear correlation coefficient between the initial value and the third-type identifier is the 14th power of 2.

In one subembodiment, the K candidate radio signal(s) and the first radio signal correspond to (K+1) PSSCHs respectively, the (K+1) PSSCHs are configured through (K+1) SCIs, and the (K+1) SCIs all include the third-type identifier.

In one subembodiment, the third-type identifier is a Group Destination ID field in TS 36.212.

In one subembodiment, the third-type identifier occupies 8 bits.

In one embodiment, the K candidate radio signal(s) and the first radio signal are transmitted by the second node U2, the K candidate radio signal(s) include(s) K Cyclic Redundancy Checks (CRCs) respectively, the first radio signal includes a given CRC, scrambling sequences employed by the K CRC(s) and the given CRC all use the third-type identifier as an initial value.

In one embodiment, the phrase that the K candidate radio signal(s) and the first radio signal are transmitted by one same transmitter includes: a scrambling sequence(s) employed by K candidate radio signal(s) and a scrambling sequence employed by the first radio signal all use the third-type identifier as an initial value.

In one embodiment, a transmitter of the K candidate radio signal(s) transmits the K1 candidate radio signal(s) among the K candidate radio signal(s) employing a same transmitting power.

In one subembodiment, the second node U2 transmits the first radio signal and the K1 candidate radio signal(s) among the K candidate radio signal(s) employing a same transmitting power.

In one embodiment, the first node U1 is one terminal.

In one embodiment, the first node U1 is one UE.

In one embodiment, the first node U1 is one vehicle.

In one embodiment, the first node U1 is one Road Side Unit (RSU).

In one embodiment, the second node U2 is one terminal.

In one embodiment, the second node U2 is one UE.

In one embodiment, the second node U2 is one vehicle.

In one embodiment, the second node U2 is one RSU.

Embodiment 6

Figure 6:
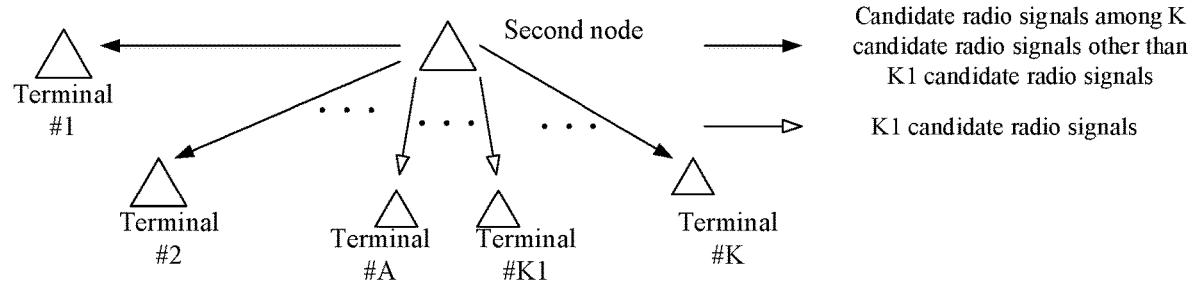
FIG. 6 is a diagram illustrating K candidate radio signals according to one embodiment of the disclosure.

Embodiment 6 illustrates a diagram of K candidate radio signals, as shown in FIG. 6. In FIG. 6, the second node in the disclosure transmits the K candidate radio signals, the K candidate radio signals are radio signals targeting K terminals respectively, the first node in the disclosure receives the K candidate radio signals, the K candidate radio signals are associated to K first-type identifiers respectively, and only K1 first-type identifiers among the K first-type identifiers are equal to the first identifier; the K1 first-type identifiers are associated to K1 candidate radio signals among the K candidate radio signals respectively; only the K1 candidate radio signals among the K candidate radio signals can be used for controlling a receiving power of the first radio signal; the K is a positive integer, and the K1 is a positive integer not greater than the K; and each one of the K first-type identifier(s) is an integer.

In one embodiment, the phrase that the first node receives the K candidate radio signal includes: the first node receives the K candidate radio signals through a blind detection.

In one embodiment, the phrase that the first node receives the K candidate radio signal includes: the first node receives the K candidate radio signals through sensing.

In one embodiment, the phrase that the first node receives the K candidate radio signal includes: the first node receives the K candidate radio signals through a coherent detection.

In one embodiment, the phrase that the first node receives the K candidate radio signal includes: the first node determines the K candidate radio signals through an energy detection.

In one embodiment, K1 candidate pathlosses are respectively K1 pathlosses from the second node to K1 terminals corresponding to the K1 candidate radio signals, and any two of the K1 candidate pathlosses have an absolute difference not greater than a given threshold.

In one subembodiment, the first node is one of the K1 terminals.

In one subembodiment, the first node is one terminal other than the K1 terminals, a pathloss from the second node to the first node and any one of the K1 candidate pathlosses have an absolute difference not greater than the given threshold.

Embodiment 7

Figure 7:
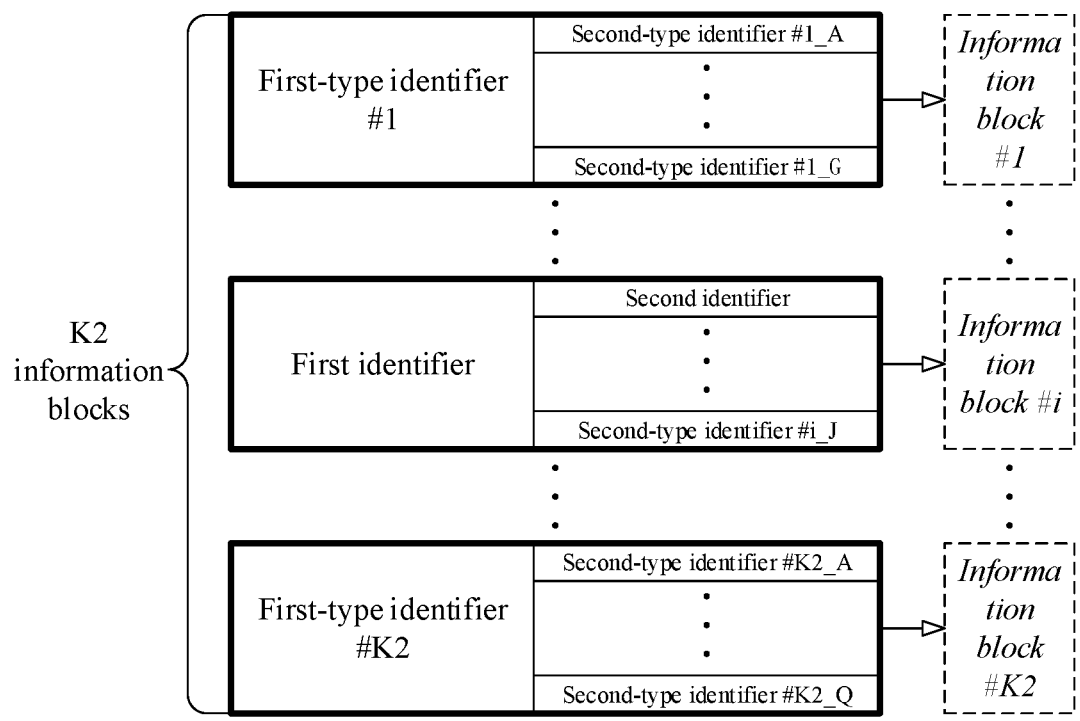
FIG. 7 is a diagram illustrating K2 information blocks according to one embodiment of the disclosure.

Embodiment 7 illustrates a diagram of K2 information blocks, as shown in FIG. 7. In FIG. 7, the K2 information blocks correspond to an information block #1 to an information block #K2, and any one of the K2 information blocks includes one first-type identifier and a positive integer number of second-type identifiers; an information block #i exists among the K2 information blocks; the first-type identifier included in the information block #i is the first identifier in the disclosure, and the information block #i includes the second identifier in the disclosure; and the i is a positive integer not less than 1 but not greater than K2.

In one embodiment, K1 candidate radio signal(s) among the K candidate radio signal(s) in the disclosure is(are) associated to the first identifier.

In one embodiment, K1 candidate radio signal(s) among the K candidate radio signal(s) in the disclosure is(are) associated to K1 second-type identifiers respectively, the second identifier is one of the K1 second-type identifier(s), and the information block #i includes the K1 second-type identifier(s).

In one embodiment, the second identifier is used for uniquely determining the first node in the disclosure from all terminals performing sidelink communication with the second node in the disclosure.

In one embodiment, the second-type identifier included in any one of the K2 information blocks is used for determining one terminal from all terminals performing sidelink communication with the second node in the disclosure.

In one embodiment, the second node in the disclosure maintains the K2 information blocks.

In one embodiment, the K2 information blocks are all associated with the same third-type identifier indicated by the K candidate radio signal(s) and the first radio signal in the disclosure.

Embodiment 8

Figure 8:
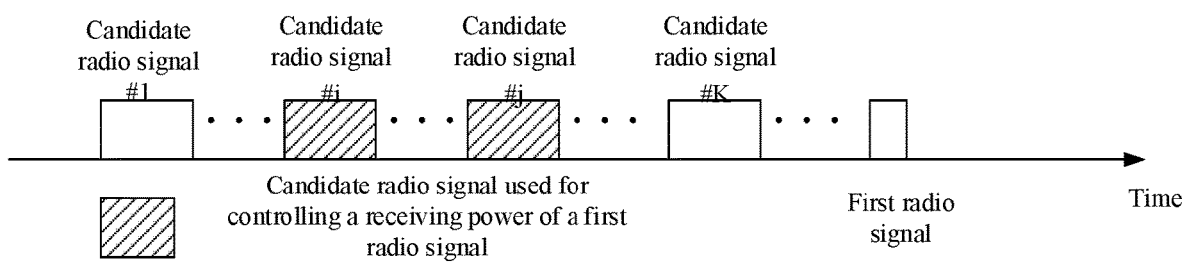
FIG. 8 is a diagram illustrating a time sequence relationship between K candidate radio signals and a first radio signal according to one embodiment of the disclosure.

Embodiment 8 illustrates a diagram of a time sequence relationship between K candidate radio signals and a first radio signal, as shown in FIG. 8. In FIG. 8, the K candidate radio signals are distributed successively in time domain, which are marked as a candidate radio signal #1 to a candidate radio signal #K in sequence; a start time of the first radio signal in time domain is located behind an end time of the candidate radio signal #K; a first-type identifier associated to a candidate radio signal #i shown in FIG. 8 and a first-type identifier associated to a candidate radio signal #j shown in FIG. 8 are both equal to the first identifier in the disclosure, and between the candidate radio signal #i and the candidate radio signal #j there exists no candidate radio signal associated to the first identifier.

In one embodiment, any two of the K candidate radio signals are non-overlapping in time domain.

In one subembodiment, the phrase that any two of the K candidate radio signals are non-overlapping in time domain includes: no multicarrier symbol belongs simultaneously to time domain resources occupied respectively by two of the K candidate radio signals.

In one embodiment, frequency domain resources occupied by the K candidate radio signals all belong to one carrier.

In one embodiment, frequency domain resources occupied by the K candidate radio signals all belong to one Component Carrier (CC).

In one embodiment, frequency domain resources occupied by the K candidate radio signals all belong to one Bandwidth Part (BWP).

In one embodiment, at least two of the K candidate radio signals occupy inconsecutive time domain resources.

Embodiment 9

Figure 9:
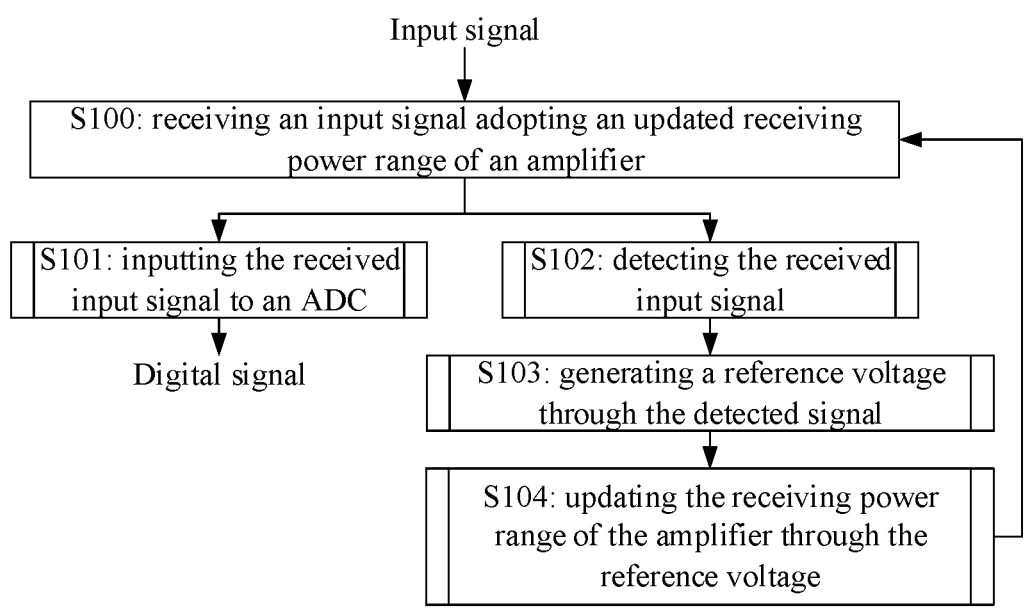
FIG. 9 is a flowchart of controlling a receiving power of a radio signal according to one embodiment of the disclosure.

Embodiment 9 illustrates a flowchart of controlling a receiving power of a radio signal according to one embodiment of the disclosure, as shown in FIG. 9. The first node in the disclosure executes the following steps.

S100: receiving an input signal adopting an updated receiving power range of an amplifier.

S101: inputting the received input signal to an ADC.

S102: detecting the received input signal.

S103: generating a reference voltage through the detected signal.

S104: updating the receiving power range of the amplifier through the reference voltage, and returning to S100.

In one embodiment, in view of the scenarios in Embodiment 8, the first node detects no radio signal coming from the second node before receiving a candidate radio signal #1; when the first node receives the candidate radio signal #1, the first node selects autonomously the initial value of the reference voltage; or, when the first node receives the candidate radio signal #1, the initial value of the reference voltage is fixed; or, when the first node receives the candidate radio signal #1, the initial value of the reference voltage is determined based on the experiences of the first node.

In one embodiment, in view of the scenarios in Embodiment 8, the reference voltage adopted by the first node to receive the candidate radio signal #j is obtained through an accumulation of an candidate radio signal #i and a positive integer number of candidate radio signals before the candidate radio signal #i, and a positive integer number of first-type identifier associated to the positive integer number of candidate radio signals are all equal to the first identifier in the disclosure.

In one embodiment, in view of the scenarios in Embodiment 8, the reference voltage adopted by the first node to receive the first radio signal is obtained through an accumulation of K1 candidate radio signals among the K candidate radio signals in the disclosure, and K1 first-type identifiers associated to the K1 candidate radio signals are all equal to the first identifier in the disclosure.

In one embodiment, time domain resources occupied by the K1 candidate radio signals among the K candidate radio signals belong to a given time window; the given time window has a fixed duration in time domain, or the given time window has a predefined duration in time domain.

In one embodiment, the receiving power of the first radio signal is obtained after the K1 candidate radio signals among the K candidate radio signals pass through S100 to S103 respectively.

In one embodiment, S11 and S12 in Embodiment 5 include: the K1 candidate radio signals among the K candidate radio signals, serving as input signals, perform the operations in S100 to S104 in accordance with a time-domain sequence, to generate K1 reference voltages and perform K1 updates of the receiving power range of the amplifier successively; then the first radio signal performs the operation in S100 serving as an input signal, and the receiving power range of the last update among the K1 updates of the receiving power range of the amplifier is used for receiving the first radio signal.

In one subembodiment, the receiving power range of the last update is determined through the K1 candidate radio signals.

In one subembodiment, the receiving power range of the last update is an accumulated result of the K1 updates of the receiving power range of the amplifier.

In one subembodiment, the K1 candidate radio signal are operated K1 times successively according to S100 to S104.

Embodiment 10

Figure 10:
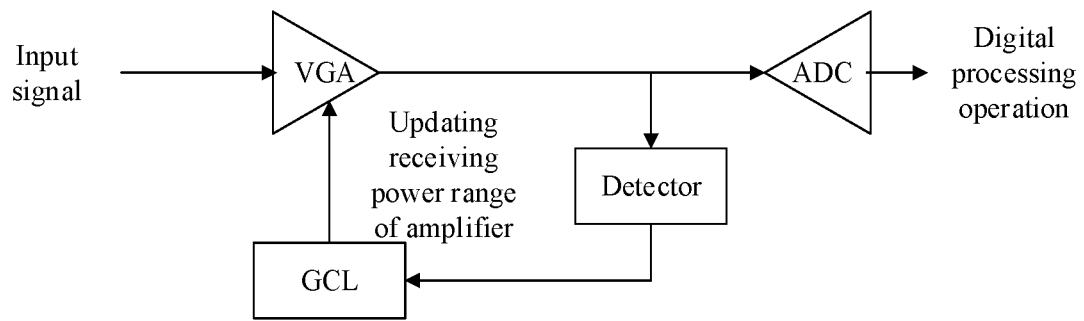
FIG. 10 is a diagram illustrating an operation unit used for controlling a receiving power according to one embodiment of the disclosure.

Embodiment 10 illustrates a diagram of an operation unit used for controlling a receiving power, as shown in FIG. 10. In FIG. 10, the operation unit used for controlling a receiving power includes:

a Variable Gain Amplifier (VGA) unit;
a Gain Control Loop (GCL) unit;
a detector unit; and
an Analog-to-Digital Converter (ADC) unit.

In Embodiment 10, the VGA unit is used for performing S100 in Embodiment 9; the detector unit is used for performing S102 in Embodiment 9 and inputting a detection result to the GCL unit; the GCL unit is used for performing S103 and S104 in Embodiment 9; and the ADC unit is used for performing the operation in S101 in Embodiment 9 of inputting a received signal to the ADC to conduct subsequent digital processing.

In one embodiment, the operation unit mentioned in Embodiment 10 belongs to the receiver illustrated in Embodiment 4.

In one embodiment, the operation unit mentioned in Embodiment 10 belongs to the multiantenna receiving processor illustrated in Embodiment 4.

In one embodiment, the operation unit mentioned in Embodiment 10 belongs to the receiving processor illustrated in Embodiment 4.

Embodiment 11

Figure 11:
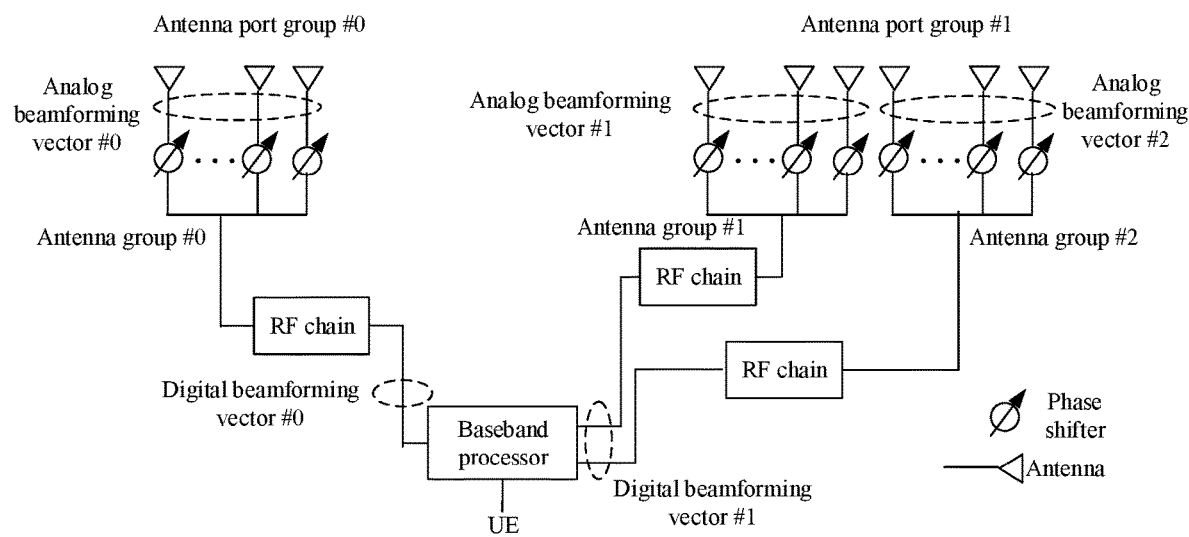
FIG. 11 is a diagram illustrating an antenna port group according to one embodiment of the disclosure.

Embodiment 11 illustrates a diagram of an antenna port and an antenna port group, as shown in FIG. 11.

In Embodiment 11, one antenna port group includes a positive integer number of antenna port(s); one antenna port is formed by antennas in a positive integer number of antenna group(s) through antenna virtualization superposition; one antenna group includes a positive integer number of antenna(s). One antenna group is connected to a baseband processor through one Radio Frequency (RF) chain, and different antenna groups correspond to different RF chains. Mapping coefficients from all antennas in a positive integer number of antenna group(s) included in a given antenna port to the given antenna port constitute a beamforming vector corresponding to the given antenna port. Mapping coefficients from multiple antennas included in any one given antenna group among a positive integer number of antenna group(s) included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 11 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna port, for example, the antenna port group #0 in FIG. 11 includes one antenna port.

Figure 13:
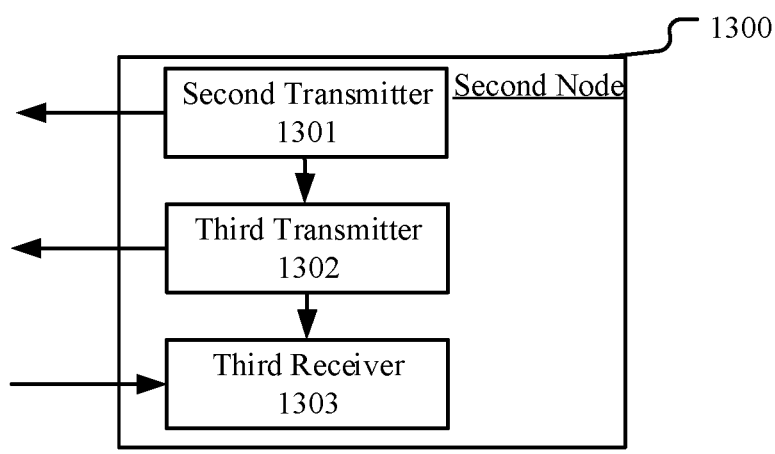
FIG. 13 is a structure block diagram illustrating a processing device in a second node according to one embodiment of the disclosure.

In one subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the corresponding analog beamforming vector of the one antenna port. For example, the digital beamforming vector #0 in FIG. 13 is dimensionally reduced to one scalar, and the beamforming vector corresponding to the antenna port in the antenna port group #0 is the analog beamforming vector #0.

In one embodiment, one antenna port group includes multiple antenna ports, for example, the antenna port group #1 in FIG. 11 includes multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in one antenna port group are QCLed.

In one subembodiment, the phrase that two antenna ports are QCLed refers that: full or partial large-scale properties of a radio signal transmitted on one of the two antenna ports can be deduced from full or partial large-scale properties of a radio signal transmitted on the other one of the two antenna ports, and the large-scale properties include one or more of delay spread, Doppler spread, Doppler shift, path loss or average gain.

In one embodiment, any two antenna ports in one antenna port group are spatially QCLed.

In one embodiment, the phrase that each one of the K first-type identifier(s) is used for determining one antenna port group includes: each one of the K first-type identifier(s) is used for indicating a group of RS resources.

In one subembodiment, the RS is used for a channel measurement on sidelink.

In one subembodiment, the RS is used for a channel measurement of a radio signal between terminals.

In one subembodiment, the RS includes a Channel State Information Reference Signal (CSI-RS).

In one subembodiment, the RS employs a same pattern as a CSI-RS.

In one subembodiment, the RS includes a Demodulation Reference Signal (DMRS).

In one subembodiment, the RS employs a same pattern as a DMRS.

In one subembodiment, the RS includes a Sounding Reference Signal (SRS).

In one subembodiment, the RS employs a same pattern as an SRS.

In one embodiment, the phrase that each one of the K first-type identifier(s) is used for determining one antenna port group includes: each one of the K first-type identifier(s) is indicated through a Transmission Configuration Indication (TCT).

In one subembodiment, the TCI is one field in an SCI.

In one embodiment, the phrase that each one of the K first-type identifier(s) is used for determining one antenna port group includes: each one of the K first-type identifier(s) is indicated through an SRS Resource Indicator (SRI).

In one subembodiment, the SRI is one field in an SCI.

In one embodiment, the antenna port group in the disclosure includes a positive integer number of antenna port(s).

In one embodiment, the antenna port group in the disclosure corresponds to one group of RS resources.

In one subembodiment, the RS is used for a channel measurement on sidelink.

In one subembodiment, the RS is used for a channel measurement of a radio signal between terminals.

In one subembodiment, the RS includes a CSI-RS.

In one subembodiment, the RS includes a DMRS.

In one subembodiment, the RS includes an SRS.

Embodiment 12

Figure 12:
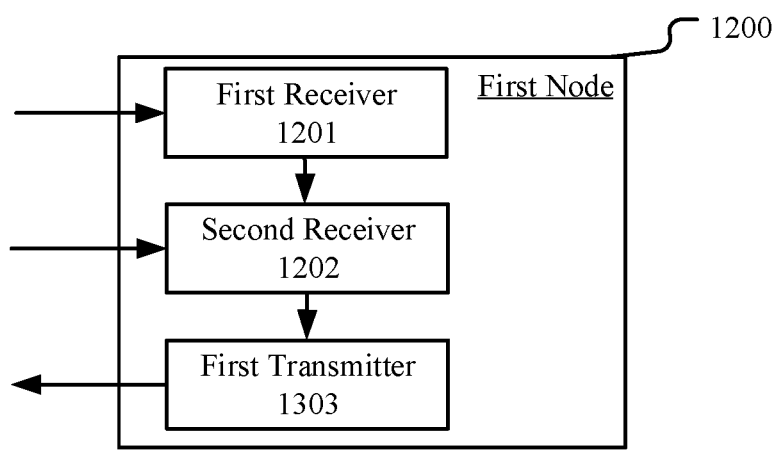
FIG. 12 is a structure block diagram illustrating a processing device in a first node according to one embodiment of the disclosure.

Embodiment 12 illustrates a structure block diagram of a processing device in a first node, as shown in FIG. 12. In FIG. 12, the processing device 1200 in the first node includes a first receiver 1201, a second receiver 1202 and a first transmitter 1203.

The first receiver 1201 receives K candidate radio signal(s).

The second receiver 1202 receives a first radio signal, the first radio signal being associated to a first identifier.

The first transmitter 1203 transmits a second radio signal.

In Embodiment 12, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; each one of the K2 information block(s) includes power control relevant information, and the power control relevant information includes at least one of an expected power and a pathloss compensation factor; the power control relevant information indicated by an information block including the first identifier among the K2 information block(s) is used for determining a transmitting power of the second radio signal; and the K candidate radio signal(s) and the first radio signal are transmitted by one same transmitter.

In one embodiment, the first receiver 1201 also receives K2 information block(s); the K2 information block(s) include(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s).

In one embodiment, each one of the K first-type identifier(s) is used for determining one antenna port group, and the antenna port group includes a positive integer number of antenna port(s).

In one embodiment, the K candidate radio signal(s) and the first radio signal all indicate a same third-type identifier.

In one embodiment, a transmitter of the K candidate radio signal(s) transmits the K1 candidate radio signal(s) among the K candidate radio signal(s) employing a same transmitting power.

In one embodiment, the first receiver 1201 includes at least the former four of the antenna 452, the receiver 454, the multiantenna receiving processor 458, the receiving processor 456 or the controller/processor 459 illustrated in Embodiment 4.

In one embodiment, the second receiver 1202 includes at least the former four of the antenna 452, the receiver 454, the multiantenna receiving processor 458, the receiving processor 456 or the controller/processor 459 illustrated in Embodiment 4.

In one embodiment, the first transmitter 1203 includes at least the former four of the antenna 452, the transmitter 454, the multiantenna transmitting processor 457, the transmitting processor 468 or the controller/processor 459 illustrated in Embodiment 4.

Embodiment 13

Embodiment 13 illustrates a structure block diagram of a processing device in a second node, as shown in FIG. 13. In FIG. 13, the processing device 1300 in the second node includes a second transmitter 1301, a third transmitter 1302 and a third receiver 1303.

The second transmitter 1301 transmits K candidate radio signal(s).

The third transmitter 1302 transmits a first radio signal, the first radio signal being associated to a first identifier.

The third receiver 1303 receives a second radio signal.

In Embodiment 13, the K candidate radio signal(s) is(are) associated to K first-type identifier(s) respectively, and only K1 first-type identifier(s) among the K first-type identifier(s) is(are) equal to the first identifier; the K1 first-type identifier(s) is(are) associated to K1 candidate radio signal(s) among the K candidate radio signal(s) respectively; only the K1 candidate radio signal(s) among the K candidate radio signal(s) can be used for controlling a receiving power of the first radio signal; the K is a positive integer, and the K1 is a positive integer not greater than the K; each one of the K first-type identifier(s) is an integer; each one of the K2 information block(s) includes power control relevant information, and the power control relevant information includes at least one of an expected power and a pathloss compensation factor; the power control relevant information indicated by an information block including the first identifier among the K2 information block(s) is used for determining a transmitting power of the second radio signal.

In one embodiment, the second transmitter 1301 also transmits K2 information block(s); the K2 information block(s) include(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s).

In one embodiment, each one of the K first-type identifier(s) is used for determining one antenna port group, and the antenna port group includes a positive integer number of antenna port(s).

In one embodiment, the K candidate radio signal(s) and the first radio signal all indicate a same third-type identifier.

In one embodiment, the second node transmits the K1 candidate radio signal(s) among the K candidate radio signal(s) employing a same transmitting power.

In one embodiment, the second transmitter 1301 includes at least the former four of the antenna 420, the transmitter 418, the multiantenna transmitting processor 471, the transmitting processor 416 or the controller/processor 475 illustrated in Embodiment 4.

In one embodiment, the third transmitter 1302 includes at least the former four of the antenna 420, the transmitter 418, the multiantenna transmitting processor 471, the transmitting processor 416 or the controller/processor 475 illustrated in Embodiment 4.

In one embodiment, the third receiver 1303 includes at least the former four of the antenna 420, the receiver 418, the multiantenna receiving processor 472, the receiving processor 470 or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but not limited to mobile phones, tablet computers, notebooks, network cards, low-power equipment, eMTC terminals, NB-IOT terminals, vehicle-mounted communication equipment, aircrafts, airplanes, unmanned aerial vehicles, telecontrolled aircrafts, and other radio communication equipment. The second node in the disclosure includes but not limited to mobile phones, tablet computers, notebooks, network cards, low-power equipment, eMTC terminals, NB-IOT terminals, vehicle-mounted communication equipment, aircrafts, airplanes, unmanned aerial vehicles, telecontrolled aircrafts, and other radio communication equipment. The UE or terminal in the disclosure includes but not limited to mobile phones, tablet computers, notebooks, network cards, low-power equipment, eMTC terminals, NB-IOT terminals, vehicle-mounted communication equipment, aircrafts, airplanes, unmanned aerial vehicles, telecontrolled aircrafts, and other radio communication equipment. The base station equipment or base station or network side equipment in the disclosure includes but not limited to macro-cellular base stations, micro-cellular base stations, home base stations, relay base stations, eNBs, gNBs, TRPs, GNSSs, relay satellites, satellite base stations, air base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
receiving K2 information block(s);
receiving K candidate radio signals; and
receiving a first radio signal, the first radio signal being associated to a first identifier;
wherein the K candidate radio signals are associated to K first-type identifiers respectively, and only K1 first-type identifiers among the K first-type identifiers are equal to the first identifier; the K1 first-type identifiers are associated to K1 candidate radio signals among the K candidate radio signals respectively; only the K1 candidate radio signals among the K candidate radio signals can be used for controlling a receiving power of the first radio signal; the K is a positive integer greater than 1, and the K1 is a positive integer greater than 1 and not greater than the K; each one of the K first-type identifier is an integer; and the K candidate radio signals and the first radio signal are transmitted by one same transmitter; only the K1 candidate radio signals among the K candidate radio signals can be used for an AGC of the first radio signal, or only the receiving powers of the K1 candidate radio signals among the K candidate radio signals can be used for adjusting an amplitude of an amplifier for the first radio signal; the K2 information block(s) comprise(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s); the K candidate radio signals are scheduled for K terminals respectively, or the K candidate radio signals are data channels transmitted to the K terminals respectively; the K terminals comprise all terminals performing sidelink communication with a transmitter of the first radio signal; any one of the K2 information blocks comprises one first-type identifier and a positive integer number of second-type identifier(s); the K candidate radio signals comprise K second-type identifiers respectively, and the K second-type identifiers are used for indicating K terminals respectively; any one of the K second-type identifiers is indicated by one of the K2 information block(s); the K1 candidate radio signals are associated to K1 second-type identifiers respectively, the second identifier is one of the K1 second-type identifiers, and the first radio signal comprises the second identifier, the second identifier is used for uniquely determining the first node from the K terminals; the first identifier corresponds to one AGC process or the first identifier is used for identifying one AGC process; a transmitter of the K candidate radio signals and the first radio signal is a second node, the second node maintains K2 AGC process(es), the first identifier corresponds to one AGC process in the K2 AGC process(es), the K1 candidate radio signals among the K candidate radio signals are associated to the AGC process corresponding to the first identifier.

2. The method according to claim 1, wherein each one of the K first-type identifiers is used for determining one antenna port group, and the antenna port group comprises a positive integer number of antenna port(s).

3. The method according to claim 1, comprising:
transmitting a second radio signal;
wherein each one of the K2 information block(s) comprises power control relevant information, and the power control relevant information comprises at least one of an expected power and a pathloss compensation factor; the power control relevant information indicated by an information block comprising the first identifier among the K2 information block(s) is used for determining a transmitting power of the second radio signal.

4. The method according to claim 1, wherein the K candidate radio signals and the first radio signal all indicate a same third-type identifier.

5. The method according to claim 1, wherein a transmitter of the K candidate radio signals transmits the K1 candidate radio signals among the K candidate radio signals employing a same transmitting power.

6. The method according to claim 1, wherein the K2 information block(s) is(are) an RRC signaling(s).

7. The method according to claim 1, wherein K1 candidate pathlosses are respectively K1 pathlosses from the transmitter of the first radio signal to K1 terminals corresponding to the K1 candidate radio signals, and any two of the K1 candidate pathlosses have an absolute difference not greater than a given threshold.

8. A first node for wireless communication, comprising:
a first receiver, to receiver receives K2 information block(s); to receive K candidate radio signals; and
a second receiver, to receive a first radio signal, the first radio signal being associated to a first identifier;
wherein the K candidate radio signals are associated to K first-type identifiers respectively, and only K1 first-type identifiers among the K first-type identifiers are equal to the first identifier; the K1 first-type identifiers are associated to K1 candidate radio signals among the K candidate radio signals respectively; only the K1 candidate radio signals among the K candidate radio signals can be used for controlling a receiving power of the first radio signal; the K is a positive integer greater than 1, and the K1 is a positive integer greater than 1 and not greater than the K; each one of the K first-type identifiers is an integer; and the K candidate radio signals and the first radio signal are transmitted by one same transmitter; only the K1 candidate radio signals among the K candidate radio signals can be used for an AGC of the first radio signal, or only the receiving powers of the K1 candidate radio signals among the K candidate radio signals can be used for adjusting an amplitude of an amplifier for the first radio signal; the K2 information block(s) comprise(s) K2 first-type identifier(s) respectively, and the K2 is a positive integer; the K2 is 1 and the K2 first-type identifier is the first identifier; or, the K2 is greater than 1, and any one of the K first-type identifier(s) is equal to one of the K2 first-type identifier(s); the K candidate radio signals are scheduled for K terminals respectively, or the K candidate radio signals are a data channels transmitted to the K terminals respectively; the K terminals comprise all terminals performing sidelink communication with a transmitter of the first radio signal; any one of the K2 information blocks comprises one first-type identifier and a positive integer number of second-type identifier(s); the K candidate radio signals comprises K second-type identifiers respectively, and the K second-type identifiers are used for indicating K terminals respectively; any one of the K second-type identifiers is indicated by one of the K2 information block(s); the K1 candidate radio signals are associated to K1 second-type identifiers respectively, the second identifier is one of the K1 second-type identifiers, and the first radio signal comprises the second identifier, the second identifier is used for uniquely determining the first node from the K terminals; the first identifier corresponds to one AGC process or the first identifier is used for identifying one AGC process; a transmitter of the K candidate radio signals and the first radio signal is a second node, the second node maintains K2 AGC process(es), the first identifier corresponds to one AGC process in the K2 AGC process(es), the K1 candidate radio signals among the K candidate radio signals are associated to the AGC process corresponding to the first identifier.

9. The first node according to claim 8, wherein each one of the K first-type identifiers is used for determining one antenna port group, and the antenna port group comprises a positive integer number of antenna port(s).

10. The first node according to claim 8, comprising:
a first transmitter, to transmit a second radio signal;
wherein each one of the K2 information block(s) comprises power control relevant information, and the power control relevant information comprises at least one of an expected power and a pathloss compensation factor; the power control relevant information indicated by an information block comprising the first identifier among the K2 information block(s) is used for determining a transmitting power of the second radio signal.

11. The first node according to claim 8, wherein the K candidate radio signals and the first radio signal all indicate a same third-type identifier.

12. The first node according to claim 8, wherein a transmitter of the K candidate radio signals transmits the K1 candidate radio signals among the K candidate radio signals employing a same transmitting power.

13. The first node according to claim 8, wherein the K2 information block(s) is(are) an RRC signaling(s).

14. The first node according to claim 8, wherein K1 candidate pathlosses are respectively K1 pathlosses from the transmitter of the first radio signal to K1 terminals corresponding to the K1 candidate radio signals, and any two of the K1 candidate pathlosses have an absolute difference not greater than a given threshold.

\* \* \* \* \*